United States Patent [19]

Byszewski et al.

[11] Patent Number: 5,339,005

[45] Date of Patent: Aug. 16, 1994

[54] METHOD AND CIRCUIT FOR IMPROVING HID LAMP STARTING

[75] Inventors: Wojciech W. Byszewski, Concord; Brian Dale, Lynnfield; Philip D. Gregor, Acton; A. Bowman Budinger, Westford; Yan M. Li, Cambridge, all of Mass.

[73] Assignee: GTE Laboratories Incorporated, Waltham, Mass.

[21] Appl. No.: 132,776

[22] Filed: Oct. 6, 1993

Related U.S. Application Data

[60] Continuation of Ser. No. 816,453, Dec. 31, 1991, abandoned, which is a division of Ser. No. 529,025, May 25, 1990, Pat. No. 5,118,994.

[51] Int. Cl.$^5$ .............................................. H05B 37/00
[52] U.S. Cl. ..................... 315/244; 315/240; 315/282
[58] Field of Search ................. 315/244, 240, DIG. 5, 315/284, 291, 290, 300, 276, 282, 239, 241 R

[56] References Cited

U.S. PATENT DOCUMENTS

| | | | |
|---|---|---|---|
| 3,531,686 | 9/1970 | Wood | 315/282 |
| 4,355,265 | 10/1982 | Cohen et al. | 315/46 |
| 4,415,837 | 11/1983 | Sodini | 315/276 |
| 4,503,364 | 3/1985 | Engel | 315/276 |
| 4,713,587 | 12/1987 | Byszawski et al. | 315/276 |
| 5,049,789 | 9/1991 | Kumar et al. | 315/244 |
| 5,118,994 | 6/1992 | Byszawski et al. | 315/244 |

Primary Examiner—Robert J. Pascal
Assistant Examiner—Tan Dinh
Attorney, Agent, or Firm—Carlo S. Bessone

[57] ABSTRACT

In one aspect of the present invention a capacitor is placed in series with the ballast and the lamp. The capacitor lowers the impedance during lamp starting and is shorted out when final arc conditions of the lamp are reached. Method and device for improvement of lumen maintenance of high intensity discharge lamps through minimizing the wall blackening during lamp starting is disclosed. Reducing the electrode material sputtering during the thermionic arc phase of the lamp starting process was achieved by decreasing the cathode fall voltage. The cathode fall voltage in these lamps was decreased by increasing the current flowing through during the starting phase. The increase of starting current was achieved by increasing the open circuit voltage or by decreasing ballast impedance.

2 Claims, 16 Drawing Sheets

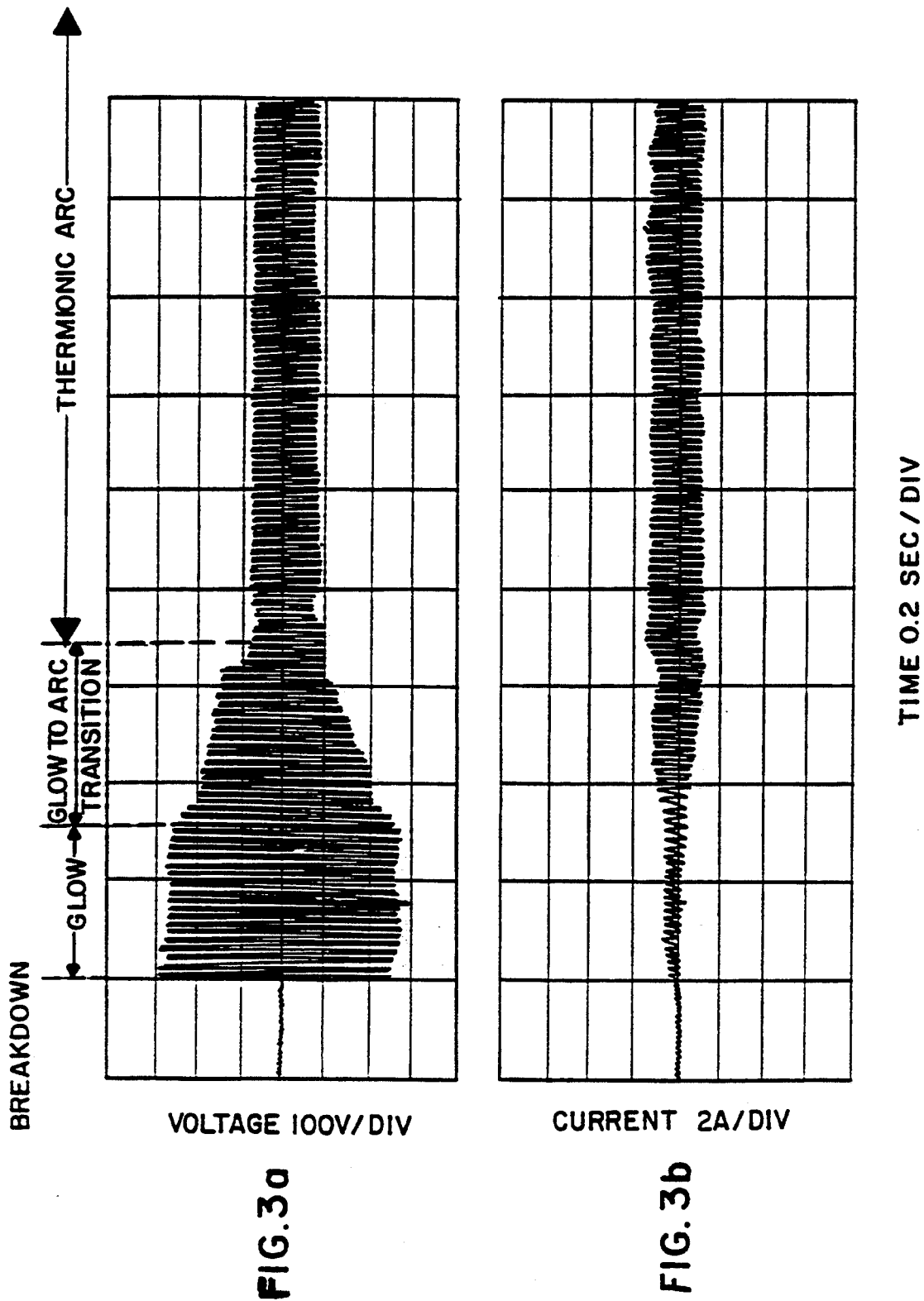

VOLTAGE 100V/DIV

CURRENT 2A/DIV

TIME 0.2 SEC/DIV

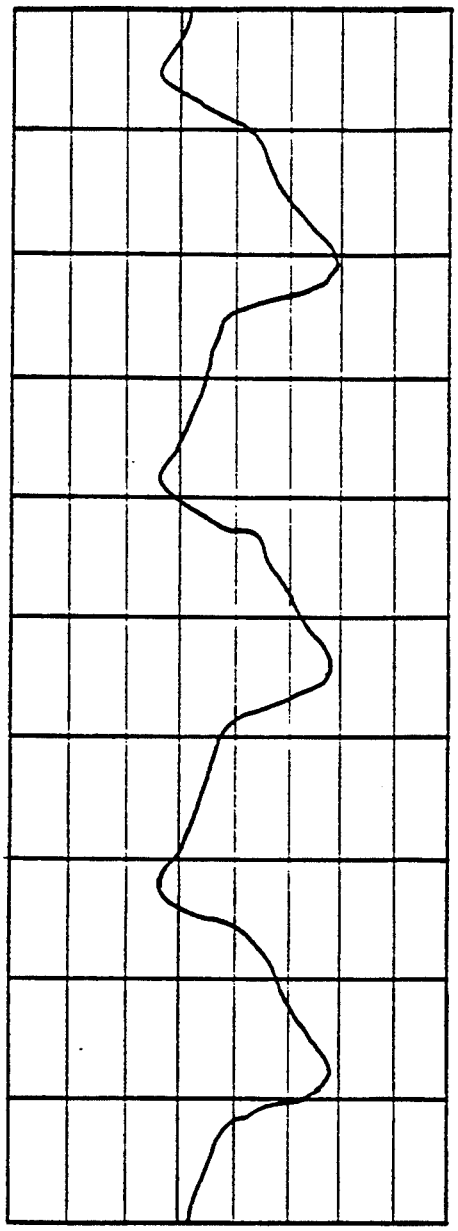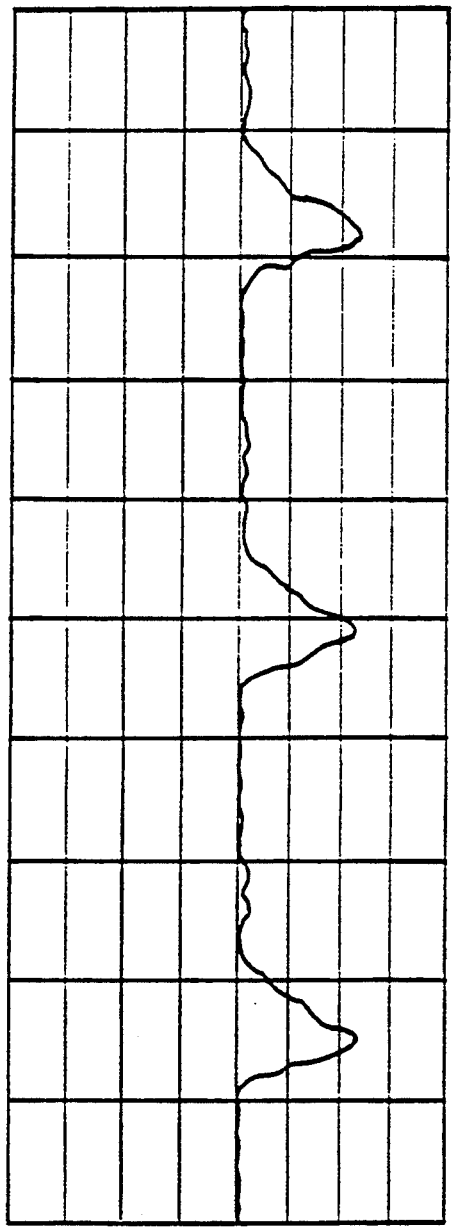
FIG.6a THERMIONIC ARC VOLTAGE 50V/DIV
FIG.6b TUNGSTEN RADIATION (4008.8 Å)
TIME (5ms/DIV)

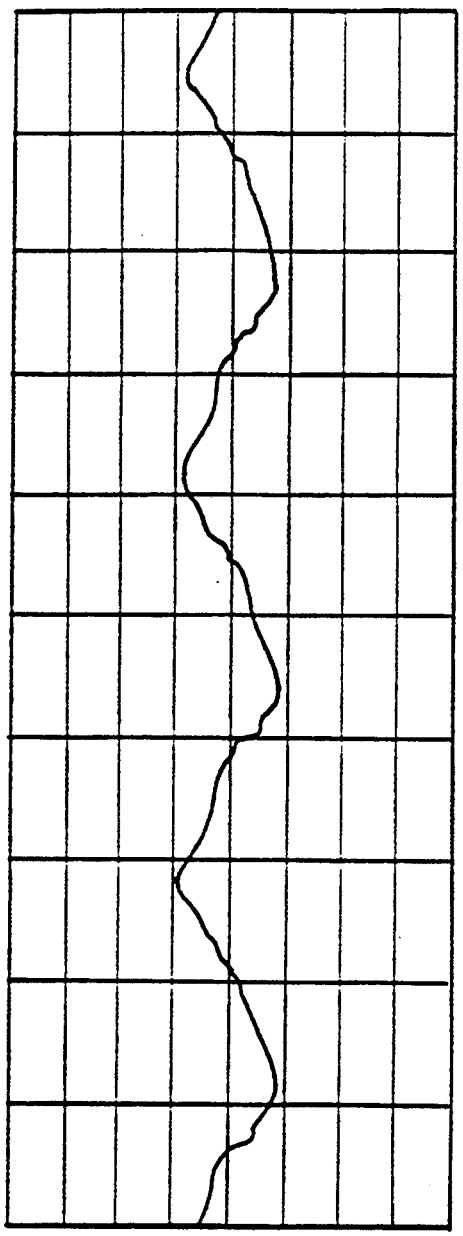 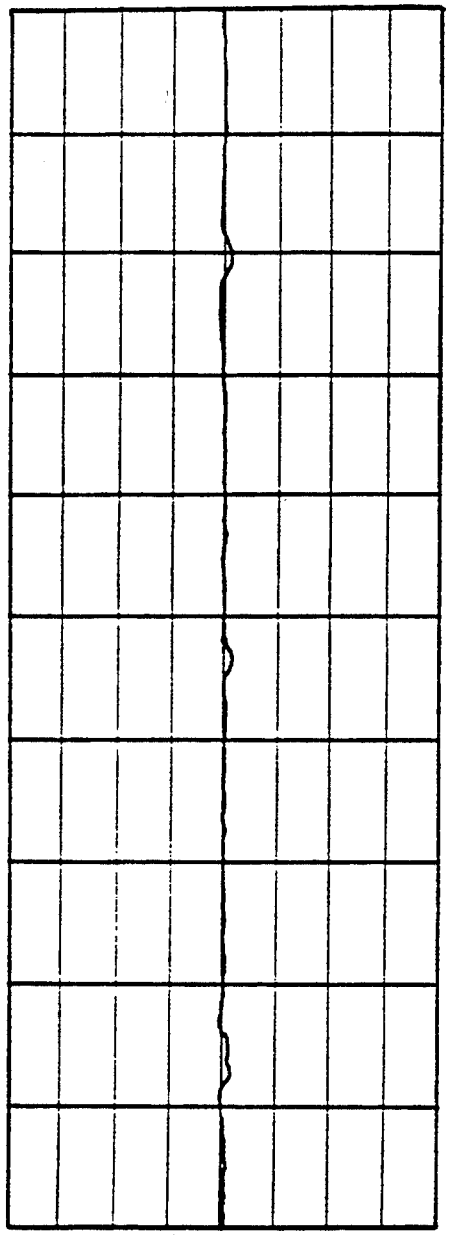
FIG.7a THERMIONIC ARC VOLTAGE 50V/DIV
FIG.7b TUNGSTEN RADIATION (4008.8Å)
TIME (5ms/DIV)

VOLTAGE 50V/DIV 4008.8 TUNGSTEN EMISSION

TIME 0.5 SEC/DIV

VOLTAGE 50V/DIV      4008.8 TUNGSTEN EMISSION

TIME 0.5 SEC/DIV

FIG.14a
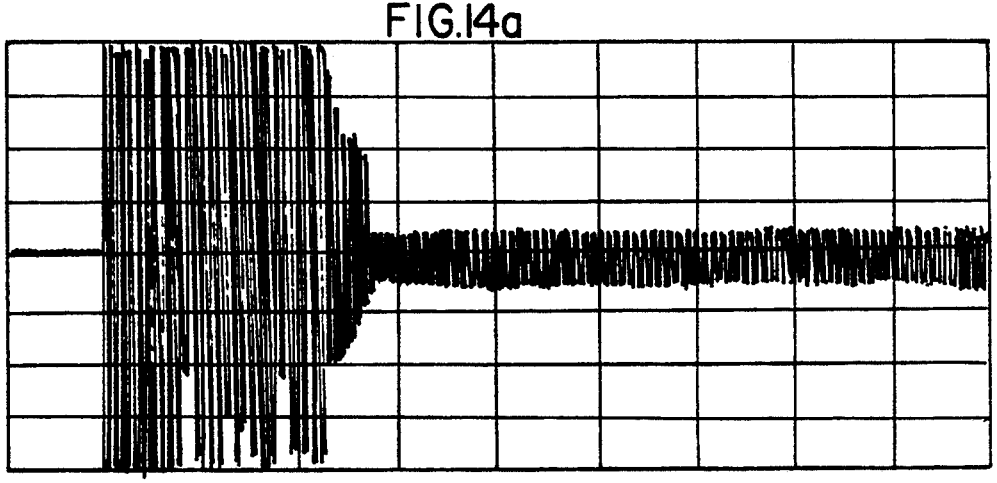
FIG.14b
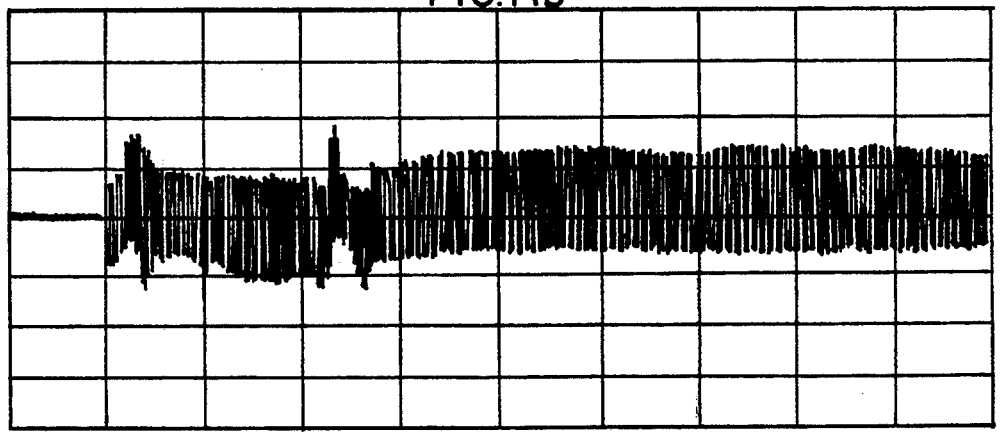
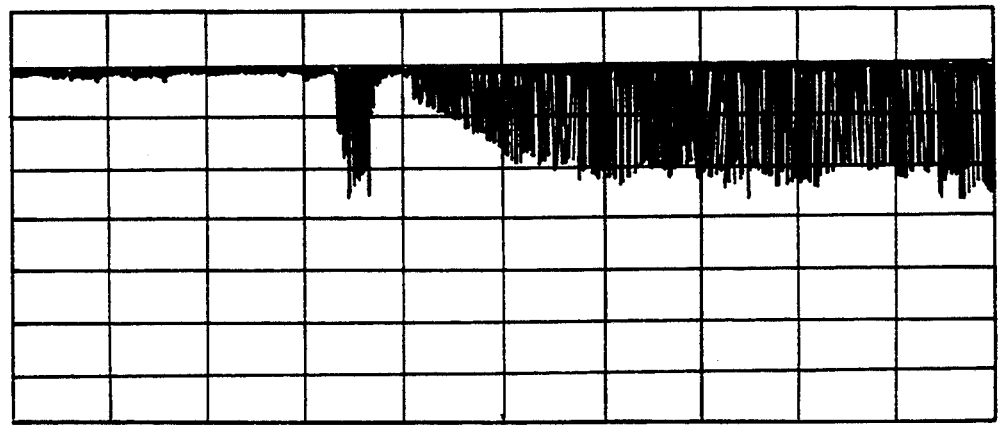
TIME 0.5 SEC/DIV
FIG.14c

TIME 0.5 SEC/DIV

TIME 0.5 SEC/DIV

METHOD AND CIRCUIT FOR IMPROVING HID LAMP STARTING

This application is a continuation of copending application Ser. No. 07/816,453 filed on Dec. 31, 1991 and now abandoned, which is divisional of 07/529,025, filed May 25, 1990, U.S. Pat. No. 5,118,994.

BACKGROUND OF THE INVENTION

This invention relates to improving the maintenance of high intensity discharge (HID) lamps over the lamps' lifetime. More specifically this invention provides methods for reducing the sputtering of cathode material during HID lamp starting.

The starting process of Metal Halide HID lamps consists of four phases: breakdown, glow, glow-to-arc transition, and thermionic arc. During each of these phases, high voltage and low pressure conditions promote the sputtering of electrode material by energetic ion bombardment at the cathode surface. The relative number of tungsten atoms sputtered in each of the above four starting phases is variable and is strongly dependent on the discharge conditions.

The effective number of atoms sputtered during the glow phase is relatively small. Similarly, only a small number of tungsten atoms are sputtered during breakdown formation, as this process is very fast and corresponding current is typically low.

The highest tungsten sputtering rate in the starting process occurs during the glow to arc transition where sputtering is enhanced under the high voltage and high current conditions required for this transition. Tungsten sputtering also occurs during the thermionic arc phase which is characterized by low gas pressure, high current, and voltage drop often above the sputtering threshold. The threshold ion energy necessary for tungsten sputtering is approximately 40 eV. The glow to arc transition occurs within a fraction of a second, and is much shorter than the thermionic arc phase which lasts typically 40 seconds in the 100 W Metalarc lamp. Therefore, although the rate of sputtering during the thermionic arc period is lower than the rate at the glow to arc transition, the length of the thermionic arc phase enables the relative number of atoms sputtered during the thermionic arc phase to exceed that of all other starting phases combined. In lamps where this is the case, tungsten atoms sputtered during the thermionic arc phase are most likely the dominant cause of wall blackening. In the normal operation of 100 W Metalarc lamps, the thermionic arc phase current is approximately 1 A RMS with voltage drops of approximately 45 V RMS. This corresponds to a peak current of 1.5 A and a peak voltage of 65 V.

During the thermionic arc phase the lamp heats up resulting in the vaporization of mercury condensate and metal halides causing an increase in gas pressure. The high pressure during the final stabilized arc discharge minimizes the number of sputtered atoms capable of diffusing through the discharge to the arc tube wall. Most of the atoms sputtered under high pressure conditions diffuse back to the cathode.

Thus, by decreasing the sputtering during the thermionic arc phase of HID lamp starting, the overall lamp wall blackening is decreased resulting in a lamp with improved maintenance. The present invention accomplishes this decrease in sputtering during the thermionic arc phase by increasing the open circuit voltage or decreasing ballast impedance and thereby enhancing the current flowing through the lamp during this phase.

SUMMARY OF THE INVENTION

The present invention describes a method and apparatus for reducing electrode sputtering during the starting of HID lamps. The method involves decreasing the cathode fall voltage through the increase of the starting current. The higher current lowers the sputtering rate during the thermionic arc phase of HID lamp starting. The method of In one embodiment of the present invention a circuit arrangement for igniting and operating a high intensity discharge lamp includes a first AC supply source providing a first AC voltage, a second AC supply source providing a second AC voltage lower than the first AC voltage, and an inductive ballast having an input and having an AC output switch means capable of coupling the first or the second AC supply source to the input of the inductive ballast. The circuit arrangement also includes control means for controlling operation of the switch means. The first AC supply source is coupled to the input of the inductive ballast during lamp starting, and the second AC supply source is coupled to the input of the inductive ballast during normal lamp operation. In a narrower embodiment of the invention, the ballast may be an autotransformer.

BRIEF DESCRIPTION OF THE DRAWING

FIG. 3(a) shows lamp voltage versus time during the starting of a 100 W Metalarc lamp and 3(b) shows lamp current versus time during the starting of a 100 W Metalarc lamp using a ballast having an RMS open circuit voltage of 210 V.

FIG. 6(a) shows the thermionic arc voltage waveform and 6(b) shows the tungsten radiation waveform in a 100 W Metalarc lamp with a ballast open circuit voltage of 220 V RMS.

FIG. 7(a) shows the thermionic arc voltage waveform and 7(b) shows the tungsten radiation waveform in a 100 W Metalarc lamp with a ballast open circuit voltage of 325 V RMS.

FIG. 14(a-c) shows voltage, current and tungsten emission profiles during starting of a 100 W Metalarc lamp using a standard ballast.

DETAILED DESCRIPTION OF THE PREFERRED EMBODIMENTS

The present invention describes a method and ballast circuit which improves lamp maintenance by eliminating or reducing sputtering during the thermionic arc phase of lamp starting while maintaining unchanged the conditions during the normal operation of the lamp. The method utilizes variable ballast circuit parameters which reduce the lamp voltage and increase the lamp current during the thermionic arc phase of lamp starting. The modifications achieve a variable impedance by connecting in series with the lamp and the existing ballast a circuit containing an additional reactive element and a switching device which will activate or deactivate the element when prescribed conditions are met. The circuit described provides a variable ballasting impedance which is optimized during the starting phase as well as during the fully developed arc.

Figure 1:
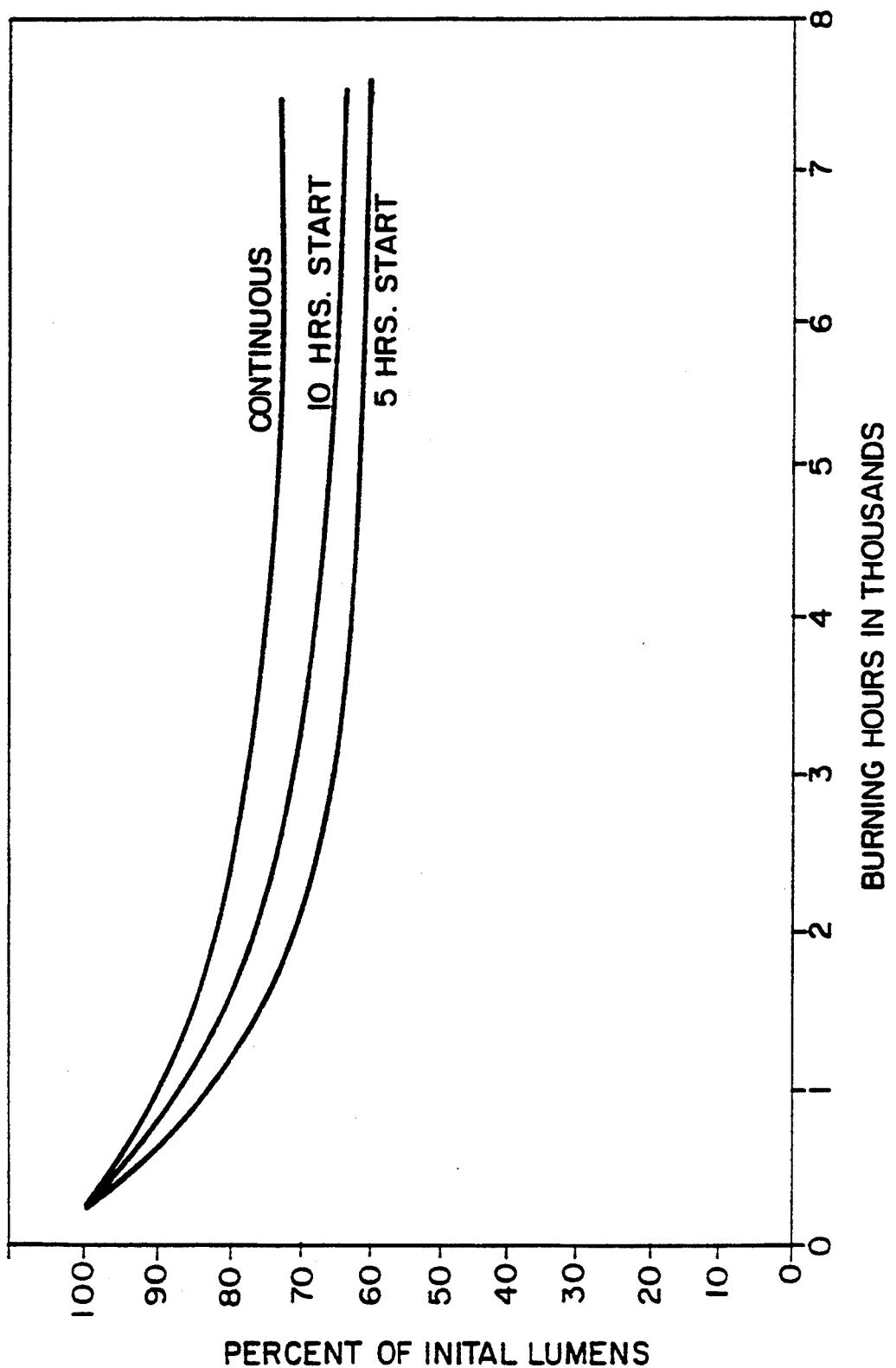
FIG. 1 presents the lumen maintenance of 175 Watt Metalarc lamps at various burning cycles: continuous operation, lamps restarted every 10 hours and lamps restarted every 5 hours, respectively.
Figure 2:
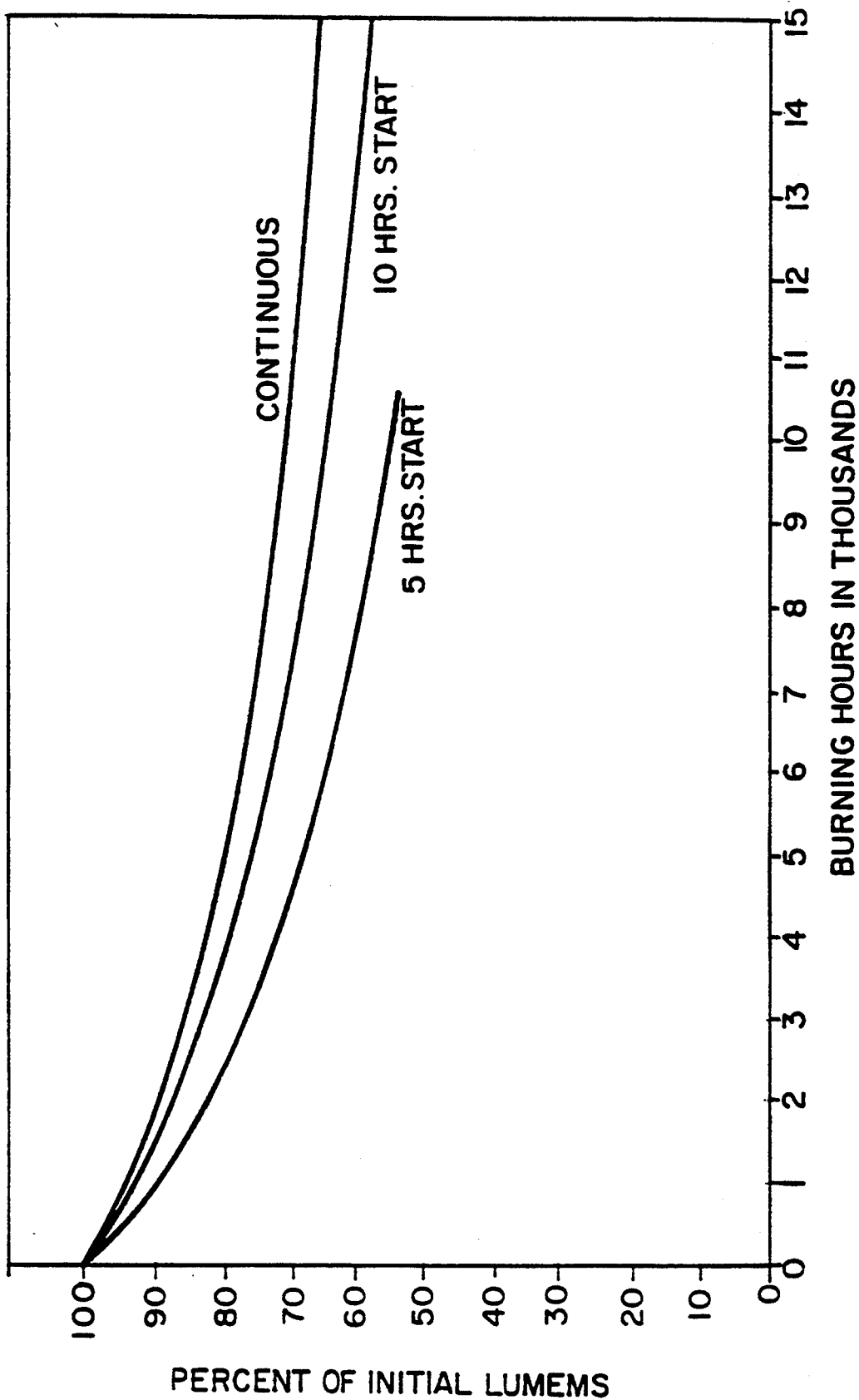
FIG. 2 presents the lumen maintenance of 400 Watt Metalarc lamps at various burning cycles: continuous operation, lamps restarted every 10 hours and lamps restarted every 5 hours, respectively.

In terms of lamp maintenance degradation occurs due to deposits of tungsten atoms on the arc tube wall. Most of this damage occurs during lamp starting when the pressure in the discharge is relatively low and the cathode fall voltage relatively high. Lumen maintenance measurements have been made comparing lumen output between lamps burned continuously, lamps burned 10 hours between re-starting and lamps burned 5 hours between re-starting. Before restarting, the lamps were allowed to cool for 2 hours. FIG. 1 contains data for the 175 W Metalarc lamp and FIG. 2 contains data for the 400 W Metalarc lamp. For lamps with the same burning time both figures indicate poorer maintenance with an increasing number of starts. Maintenance degradation resulting from starting is also expected for 100 W Metalarc lamps. Sputtering yield curves for tungsten indicate a strong dependence on the bombarding ion energies in the range of thermionic arc cathode fail voltages (40-100 V) observed in the 100 W Metalarc lamp.

Figure 4A:
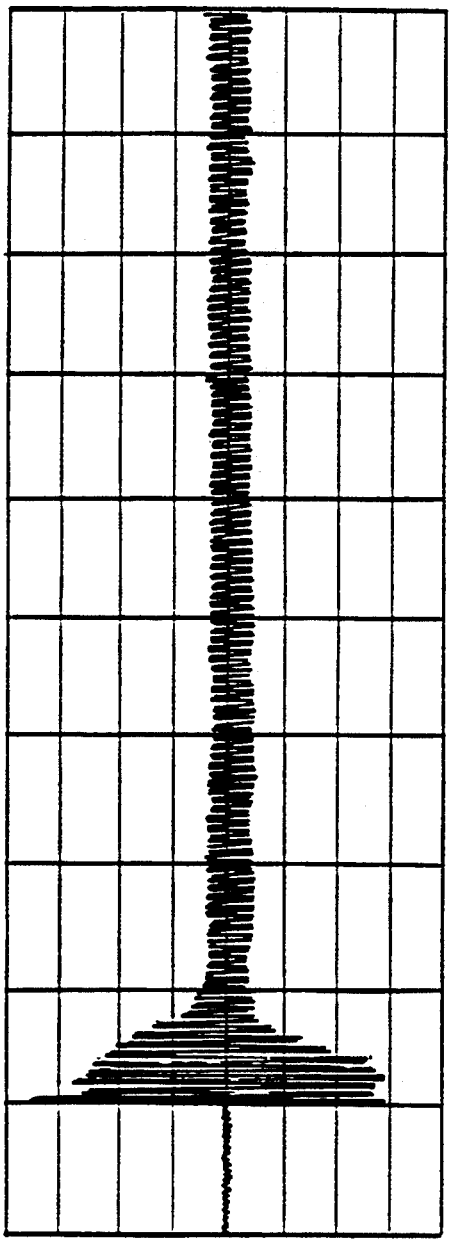
FIG. 4(a) shows lamp voltage versus time during the starting of a 100 W Metalarc lamp and 4(b) shows lamp current versus time during the starting of a 100 W Metalarc lamp using a ballast having an RMS open circuit voltage of 325 V.
Figure 4B:
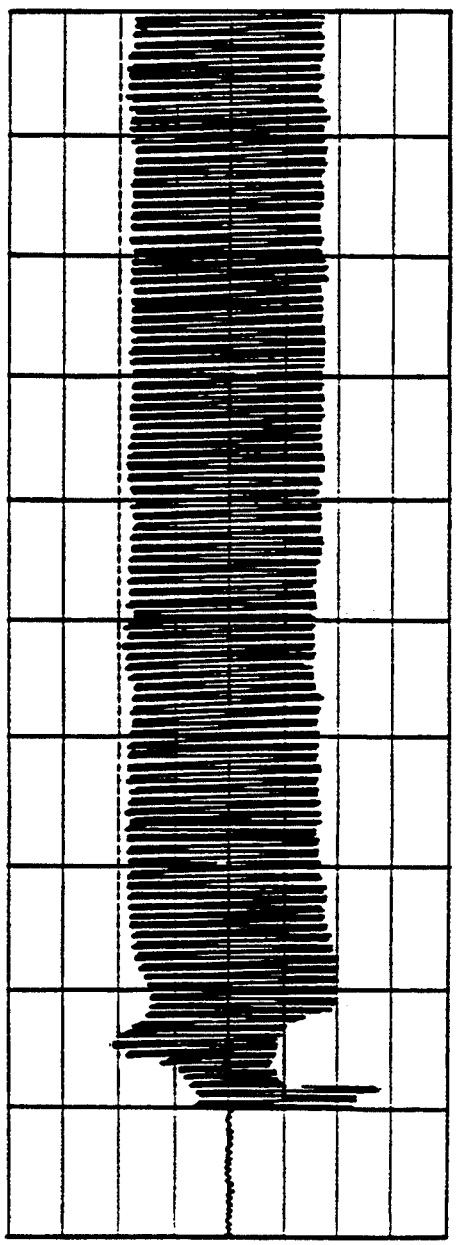

Measurements of tungsten line emission intensity as a function of lamp voltage have been made. Sylvania 100 W Metalarc lamps have been used for these measurements. The voltage drop at the cathode during the thermionic arc was controlled by the open circuit voltage applied to the lamp through changes of the line voltage supplied to the ballast. Increasing the open circuit voltage resulted in a higher current through the discharge and consequently a lower cathode fall voltage. The ballast used to operate the 100 W Metalarc lamp provides an RMS open circuit voltage of 255 V when operated on a 110 V line. FIG. 3 shows the lamp voltage and current during starting corresponding to a RMS open circuit voltage reduced to 210 V. The peak voltage during the thermionic arc, as may be measured from this waveform, is approximately 85 V. FIG. 4 shows the lamp voltage and current during starting which corresponds to a RMS open circuit voltage elevated to 325 V. In this case, only approximately 40 V peaks are measured during the thermionic arc.

Figure 5:
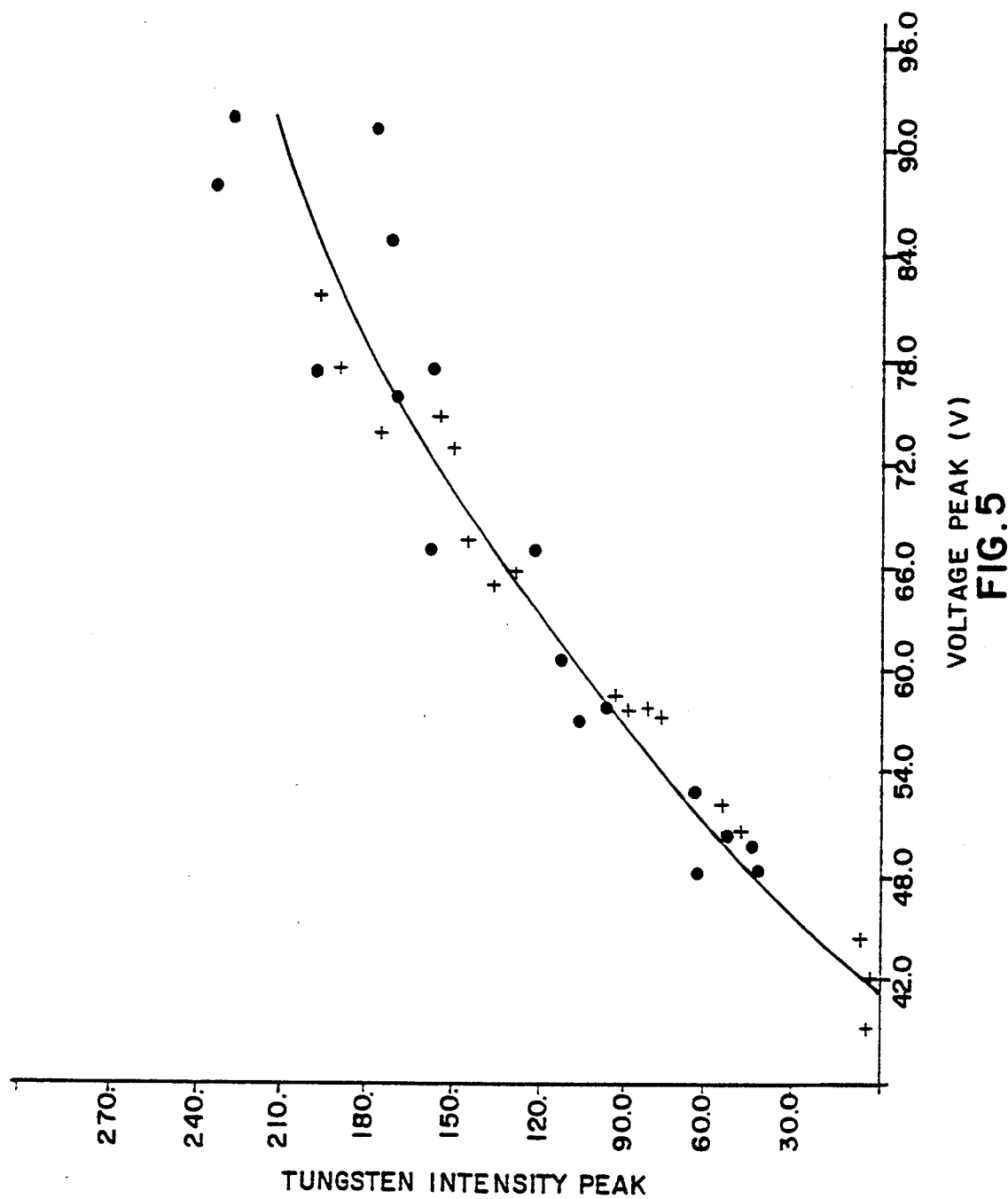
FIG. 5 shows the tungsten emission intensity versus lamp voltage during the thermionic arc phase in a 100 W Metalarc lamp.

Spectroscope measurements of tungsten emission intensity, collected in FIG. 5, show less intense emission when the thermionic arc voltage drop is low and more intense emission when the thermionic arc voltage drop is high. FIGS. 6 and 7 display oscilloscope traces comparing the tungsten emission intensity (b) between a case where the peak voltage is approximately 90 V (6a), and a case where the peak voltage is approximately 50 V (7a). The entrance slit of the monochromator views a region near the tip of the base electrode. As a result, the two preceding figures display emission of sputtered tungsten atoms mainly on the negative half cycles of voltage when the electrode nearest the investigated region is the cathode. Almost no emission was observed when the thermionic arc voltage drops below 40 V.

The data shown in FIGS. 3-7 was acquired after conditioning the lamp in a way which eliminated the coating of condensates on the surface of the electrode before starting. The condensates within the lamp remain in the same location on the wall since the lamp is run only for several seconds and allowed to cool before restarting. This allows comparison of the tungsten emission intensities at different lamp voltages as shown in FIG. 5.

HID lamps in normal service have condensates on the electrodes prior to starting. In this mode of starting the condensate redistributes itself on the arc tube walls during the breakdown and glow discharge phases. In general the thermionic arc voltage is lower when the lamp is started with condensates on the electrodes than it is when started with clean electrodes. As before, the ballast open circuit voltage has a profound effect on the cathode fall voltage during the thermionic arc and consequently on the number of tungsten atoms sputtered during this phase. When the lamp is started with condensates on the electrodes one electrode often exhibits a higher voltage drop during the thermionic arc than the other. Henceforth we will focus on the cathode with the higher voltage drop.

Figure 8A:
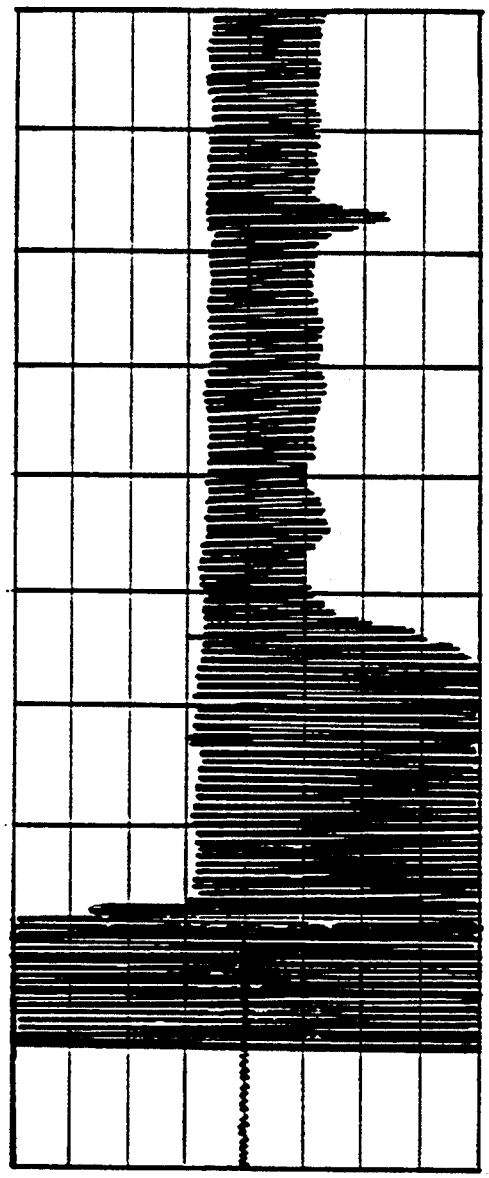
FIG. 8(a) shows the voltage and 9(b) shows the tungsten radiation during starting of a 100 W Metalarc lamp using a lamp ballast having an open circuit voltage of 255 V RMS.
Figure 8B:
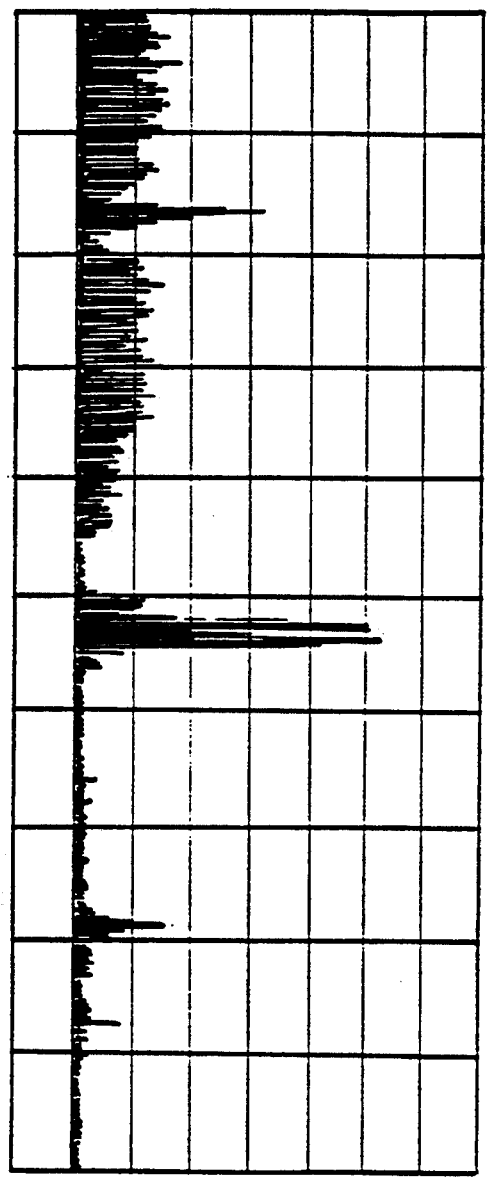
Figure 9A:
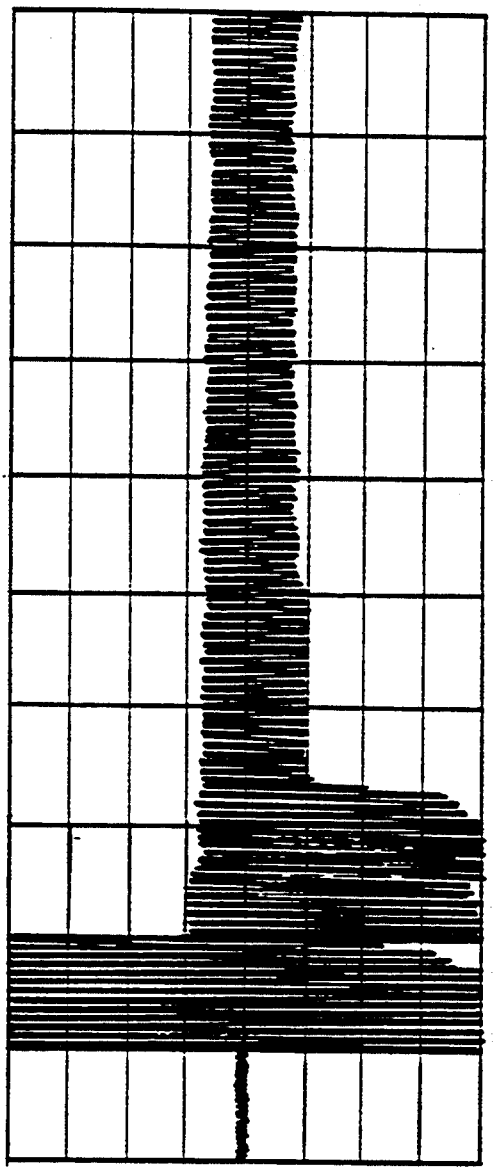
FIG. 9(a) shows the voltage and 9(b) shows the tungsten radiation during starting of a 100 W Metalarc lamp using a lamp ballast having an open circuit voltage of 290 V RMS.
Figure 9B:
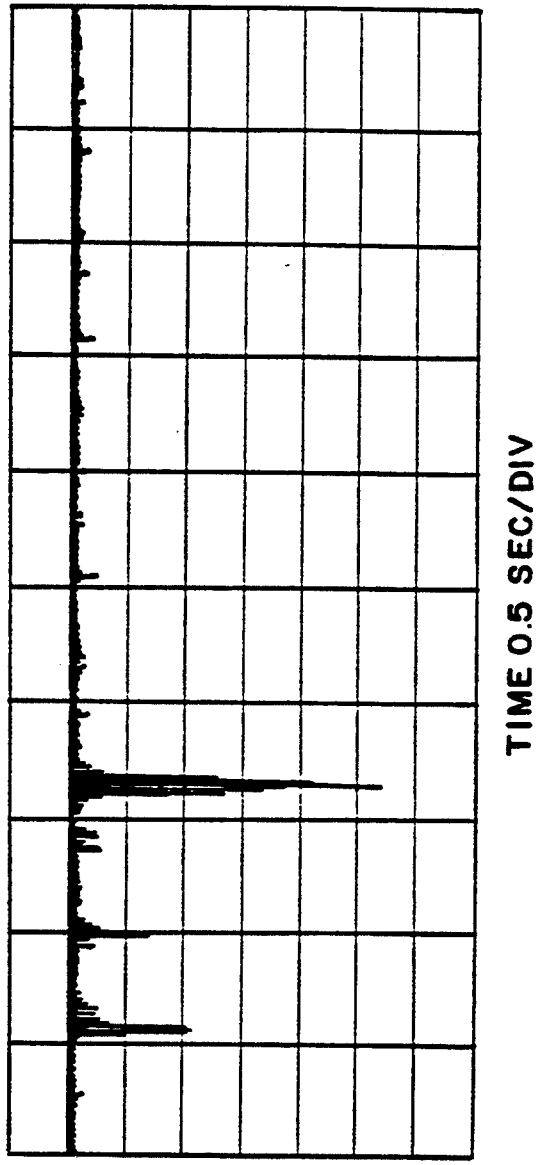

The lamp voltage and tungsten emission under normal starting conditions (condensates on the electrodes at starting and a 255 V RMS open circuit voltage) are shown in FIG. 8(a) and 8(b). The voltage drop during the cathode cycle of the investigated electrode (base electrode) is higher than for the opposite electrode. For the most part of the thermionic arc the voltage drop is 65 V which momentarily increases to 100 V at 3.75 seconds after starting. Corresponding tungsten radiation (FIG. 8b) also increases at 3.75 seconds. In FIG. 9(a) and 9(b) the ballast open circuit voltage was increased to 290 V RMS. With this increase the thermionic arc voltage drop is about 45 V. The thermionic arc voltage waveform is smoother than for the lamp operating on the normal open circuit voltage of 255 V (FIG. 8). The tungsten emission during the thermionic arc in FIG. 9(b) is greatly reduced as compared to the emission seen in FIG. 8(b).

The foregoing discussion shows that any ballast modification that produces an increased current flow through the lamp during the thermionic arc phase, results in a low cathode fall voltage which reduces or eliminates sputtering. The following examples detail ways in which this modification can be achieved.

Figure 10:
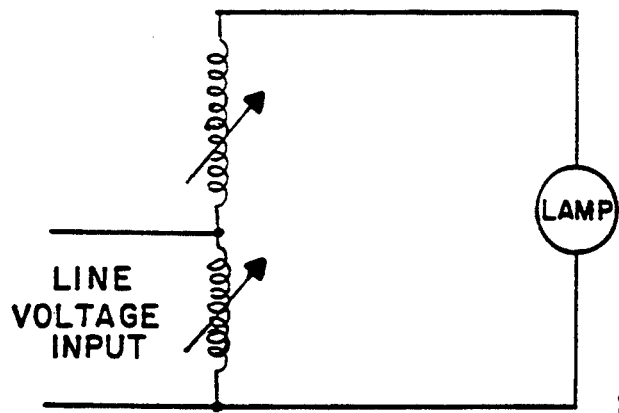
FIG. 10 shows a simplified model of a conventional ballast.

A simple diagram of the ballast-lamp system is shown in FIG. 10. The ballast is represented as an autotransformer whose input is the AC line and whose output drives the lamp.

Figure 11A:
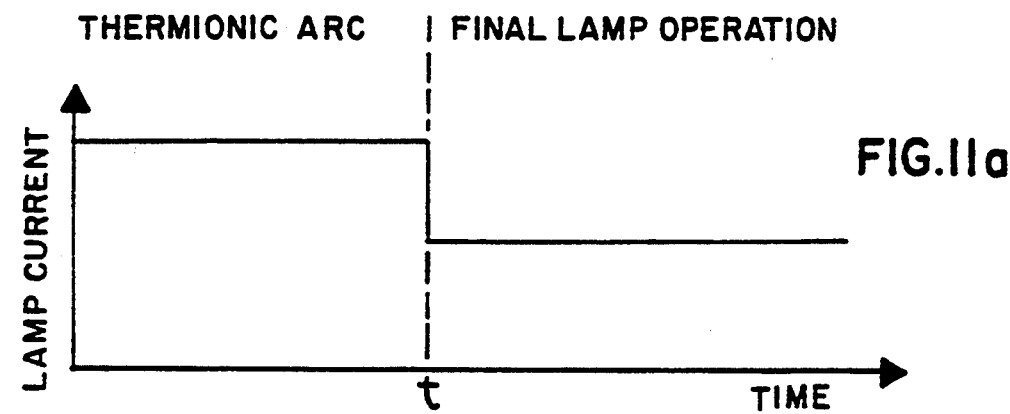
FIG. 11(a) shows the change in current produced by the ballast of the present invention, 11(b) shows how this is accomplished by changing the open circuit voltage, and 11(c) shows how this is accomplished by changing the ballast impedance.
Figure 11B:
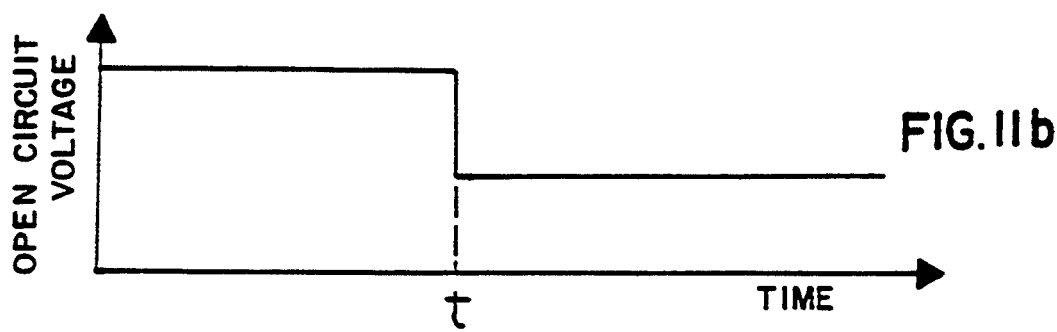
Figure 11C:
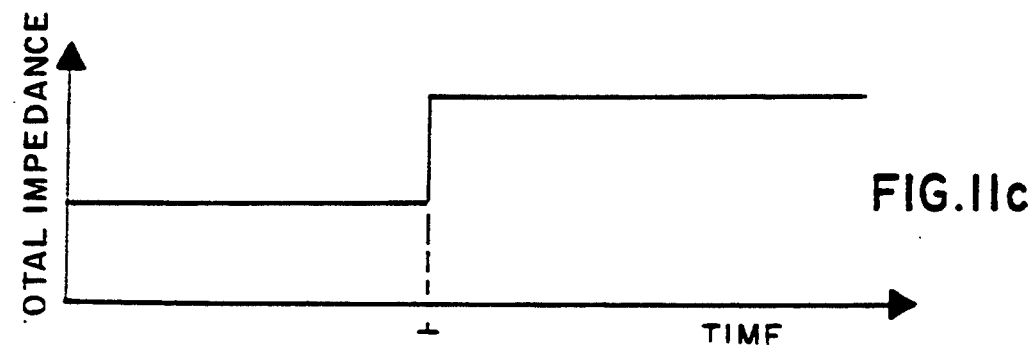

In order to lower the voltage across the lamp during the thermionic arc an increased lamp current must be maintained during this phase. When the lamp reaches final operating conditions the lamp current has to be limited so that power deposition meets lamp specifications. The desired current transition is illustrated in FIG. 11($a$). This current transition can be controlled by the ballast through variations of the open circuit voltage (FIG. 11($b$)) or through variations of the ballast impedance (FIG. 11($a$)). The transition at time $t_1$ may be set to occur at a preset time or may be triggered by the voltage level across the lamp (which increases as the lamp warms up). Time $t_1$ characterizes the thermal property of the lamp and it marks the end of the thermionic arc phase. For the 100 W Metalarc lamp, time $t_1$ is typically about 50 seconds.

Figure 12A:
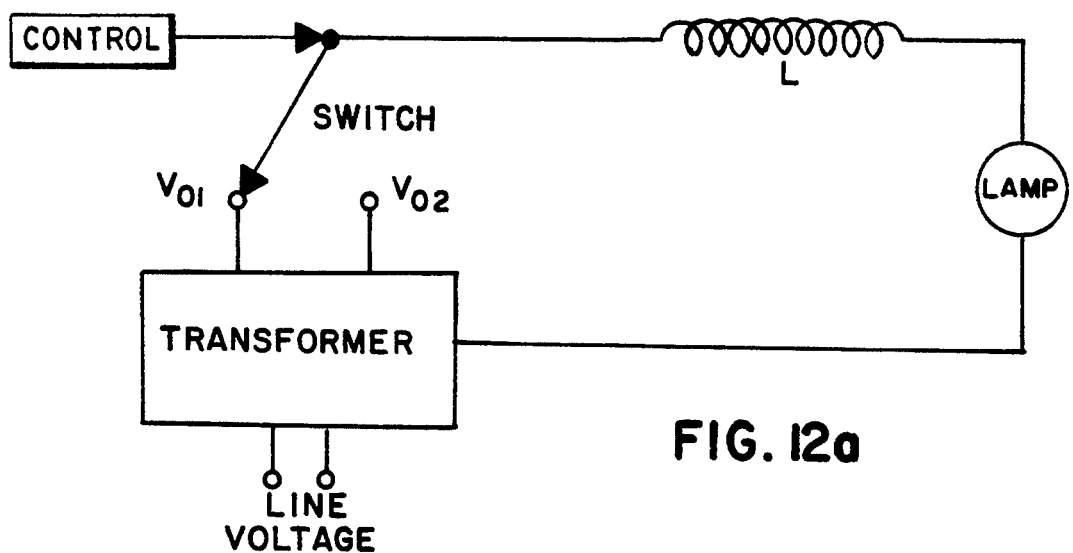
FIG. 12(a-c) shows possible circuit modifications that produce the required current changes.
Figure 12B:
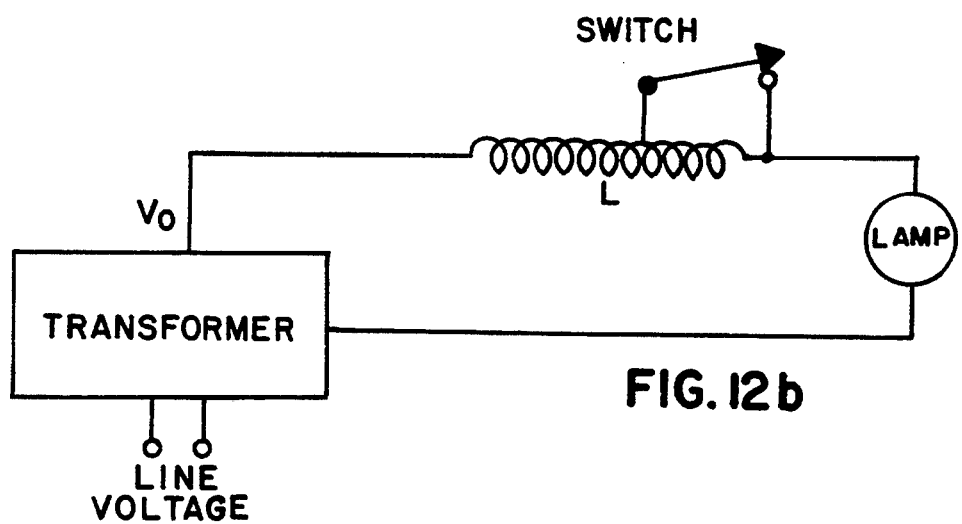
Figure 12C:
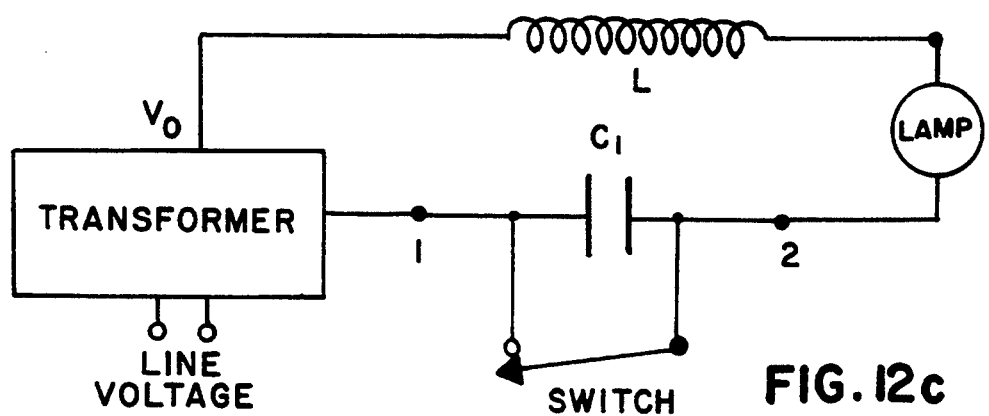

The open circuit voltage variation may be accomplished by using a ballast with two alternative transformers and a switch which would reconnect the lamp from a high open circuit voltage port to a lower voltage port at time $t_1$. Both secondary windings should have equal impedance. A schematic is shown in FIG. 12($a$) where L represents the ballast impedance. As shown in FIG. 12$a$, operation of the switch may be controlled using a switch control means (CONTROL in FIG. 12$a$). During lamp starting, the switch couples a high open circuit voltage port of first AC voltage $V_{01}$ to the input of the inductive ballast. After lamp starting, the switch control means causes the switch to couple lower voltage port of second AC voltage $V_{02}$ to the ballast input for normal operation of the lamp. The ballast circuit impedance variation may be accomplished through inductance changes (FIG. 12($b$)) or through capacitance changes (FIG. 12($c$)). In FIG. 12($b$) the inductance L is contained in the ballast circuit and its value can be reduced during the thermionic arc by closing the switch thereby increasing current flow. At time $t_1$ the switch is opened resulting in an increased circuit inductance and a decreased current flow. In FIG. 12($c$) the capacitor added in series with the lamp lowers the circuit impedance. Therefore the capacitor is active in the circuit throughout the thermionic arc phase and is bypassed as the lamp reaches the final arc by closing the switch at time $t_1$.

It would be most advantageous if the ballast modification required to carry out this invention could be implemented by placing an additional circuit in series with the lamp and existing ballast, thereby avoiding redesign of the ballast. Therefore only the last solution (FIG. 12($c$)), with the series capacitor, will be discussed here in detail.

In this example a capacitor is placed in series with the ballast and the lamp, as shown in FIG. 12($c$). Since the capacitance has a negative reactive impedance, compared to the inductive ballast, it will reduce the effective impedance of the lamp circuit. When the switch S is closed, on the other hand, circuit impedance increases. In practice, switch S will be a semi-conductor device such as a triac, and it is closed at the conclusion of the starting phase.

The impedance of the ballast, at the lamp current required for the elimination of tungsten sputtering during the thermionic arc phase, has been measured to be about 185 ohms. In order to obtain the required lamp current at an open circuit voltage of 255 V, an impedance of approximately 150 ohms is needed. This requires a negative reactive impedance of 35 ohms from the series capacitor, which can be achieved at 60 Hz using a 76 $\mu$F capacitor. After the thermionic arc phase is over and the final arc conditions are established, the capacitor is short circuited and the ballast assumes its final impedance of about 150 ohms.

U.S. Pat. No. 4,714,862 describes a circuit in which a capacitor is placed in parallel with the inductor to bypass the inductor and thereby provide a transient pulse to achieve lamp ignition. The value of capacitance is chosen such that its impedance is more than three times that of the inductance.

The purpose of the series capacitor in this invention is to provide an enhanced current for an extended period of time through decreased circuit impedance and consequently to minimize tungsten sputtering during the starting phase. The circuit utilizes a capacitive impedance which is much lower than the inductive impedance.

Figure 13:
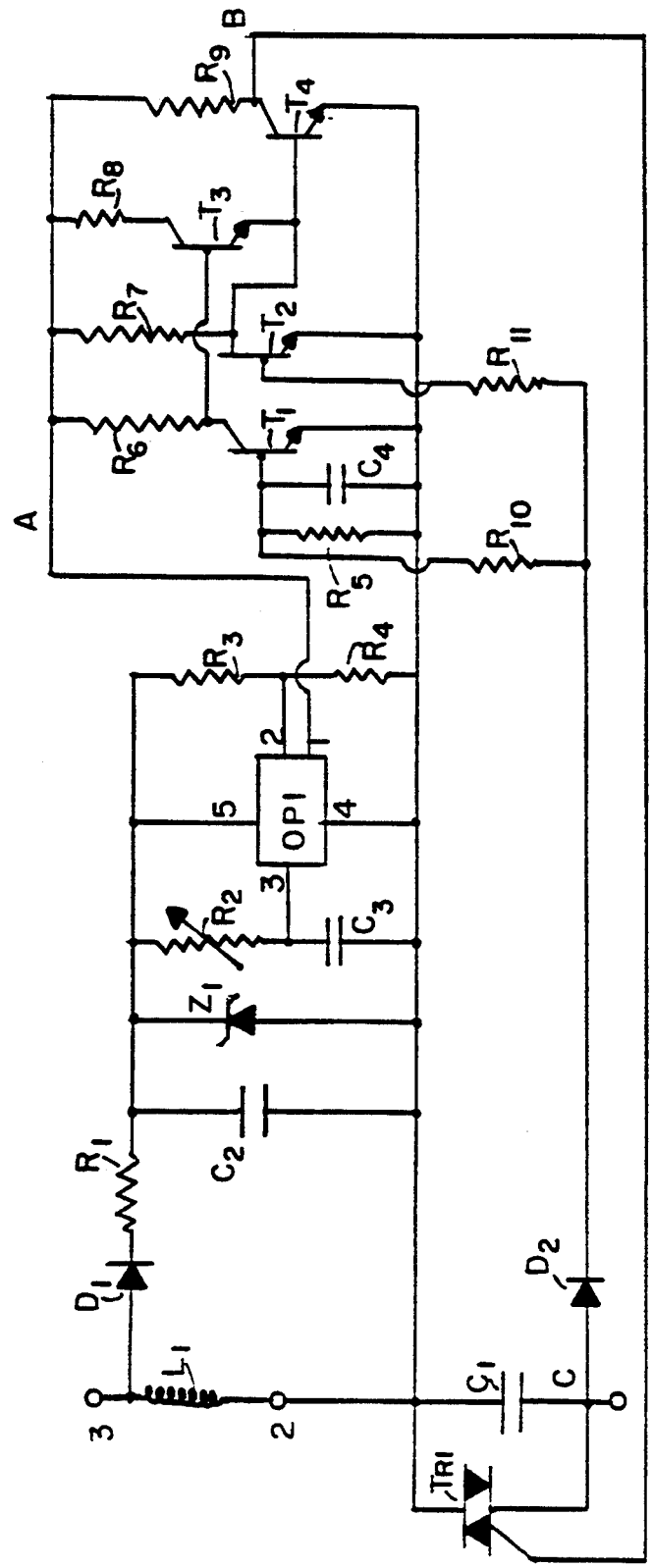
FIG. 13 shows an example of a circuit for carrying out the present invention.

In FIG. 13, the series capacitor $C_1$ is placed in parallel with a triac switching device $TR_1$. During the starting phase, the capacitor $C_1$ is in series with the lamp and the ballast inductance, thereby increasing the lamp current by decreasing the overall impedance. When the gate electrode of triac $TR_1$ receives a trigger signal, the triac switches on and shorts out the capacitor $C_1$, reestablishing the original ballast impedance for steady state operation.

The triggering circuitry requires a 5 V D.C. voltage supply. When current first flows through the lamp and inductor $L_1$, the 5 V supply is quickly established. Capacitor $C_3$ begins to charge through variable resistor $R_2$. The operational amplifier $OP_1$ compares the voltage across capacitor $C_3$ with a preset voltage created by the voltage divider network $R_3$ and $R_4$. When the capacitor $C_3$ voltage passes the pre-set voltage, the output of the operational amplifier suddenly increases to close to the 5 V supply. This concludes the timing phase and the capacitor is thereafter shorted.

However, at this time, the voltage across the capacitor $C_1$ may have any value between zero and the AC peak voltage determined by its impedance and the lamp current. The triac switch cannot be closed without risking damage because of the very large surge current as the capacitor is discharged. Accordingly, the triac must be switched on at a time very close to the zero crossing of the AC voltage across the capacitor. This is accomplished by transistors $T_1$, $T_2$, $T_3$, $T_4$, and their associated circuitry. The output of the operational amplifier is used as the positive power supply voltage for this circuitry. Transistor $T_4$ provides a narrow positive going pulse just after the zero crossing. This pulse is used to trigger the triac $TR_1$, which shorts the capacitor.

The final result is that the ballast impedance is reduced by an amount determined by the reactive impedance of $C_1$ for a time period determined by the time constant of $R_2$ and $C_3$. After this time has elapsed, the ballast impedance is increased by shorting $C_1$ with triac $TR_1$ at the zero crossing of the AC waveform across $C_1$.

Component Values

While not critical, the values used for the components in FIG. 13 are as follows:

| | |
|---|---|
| $R_1$ | 10 ohm |
| $R_2$ | 1 Mohm potentiometer |
| $R_3, R_4, R_5, R_{10}, R_{11}$ | 100 kohm |
| $R_6, R_7, R_8, R_9$ | 4.7 kohm |
| $C_1$ | 80 μF |
| $C_2$ | 2000 μF |
| $C_3$ | 100 μF |
| $OP_1$ | UA 798 TC |
| $TR_1$ | ECG 5603 |

Voltage, current and tungsten emission waveforms were recorded during the starting of a 100 W Metalarc lamp with and without the series capacitor. Tungsten emission indicates the presence of tungsten atoms in the arc tube removed from electrodes mainly due to the sputtering process. These atoms will eventually deposit on the arc tube wall causing the wall transparency to drop resulting in decreased lumen maintenance.

Figure 15A:
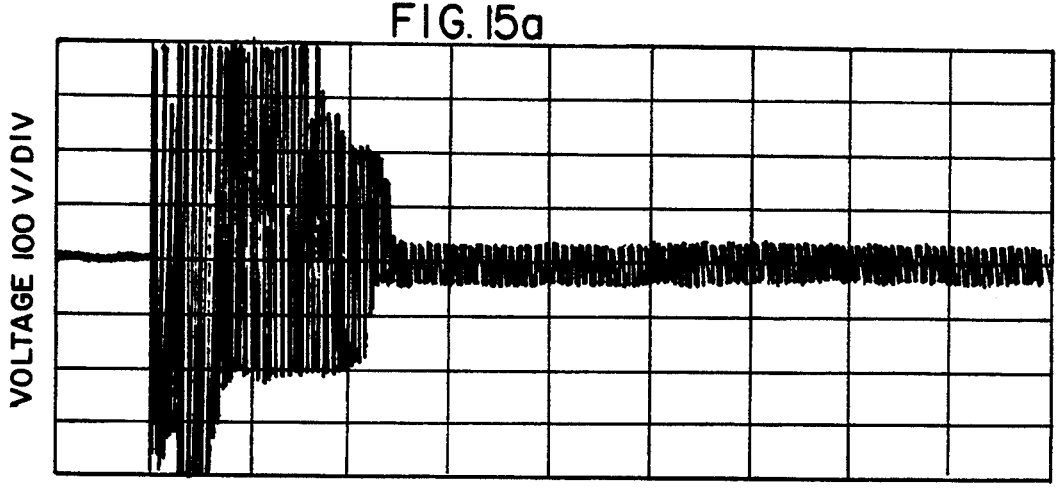
FIG. 15(a-c) shows voltage, current and tungsten emission profiles during starting of a 100 W Metalarc lamp using a ballast having a series capacitor.
Figure 15B:
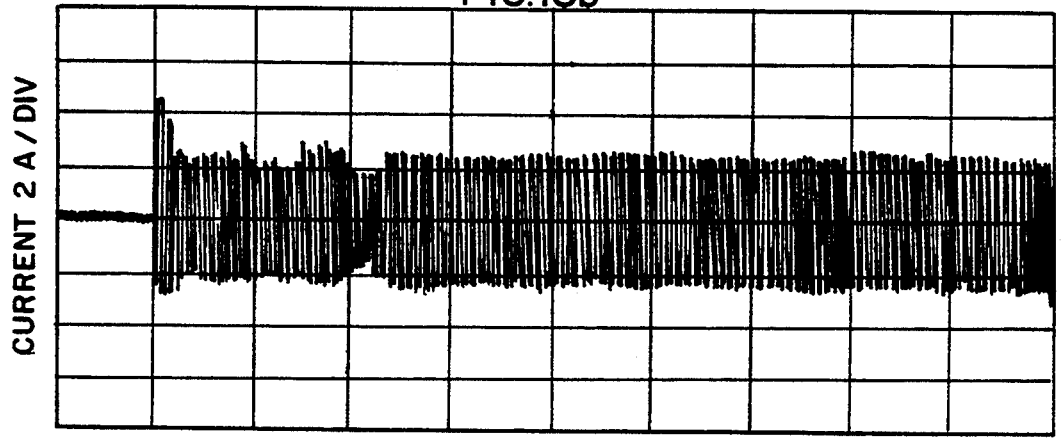
Figure 15C:
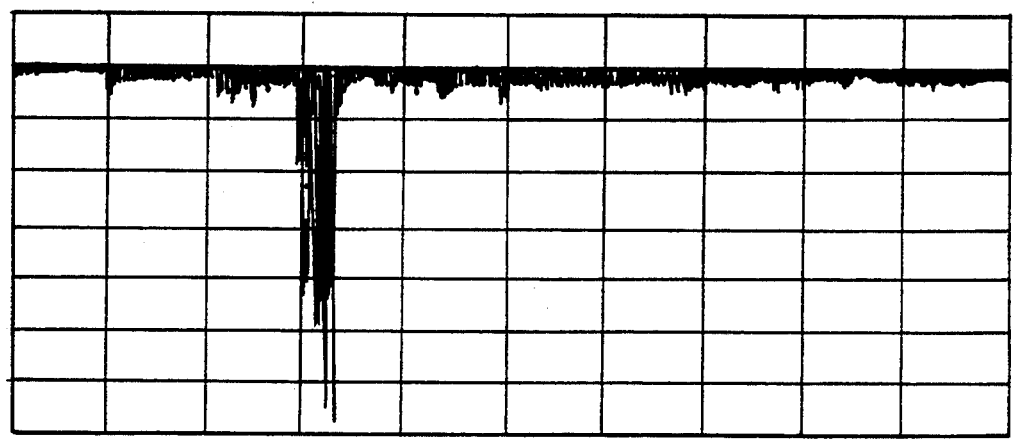
Figure 16A:
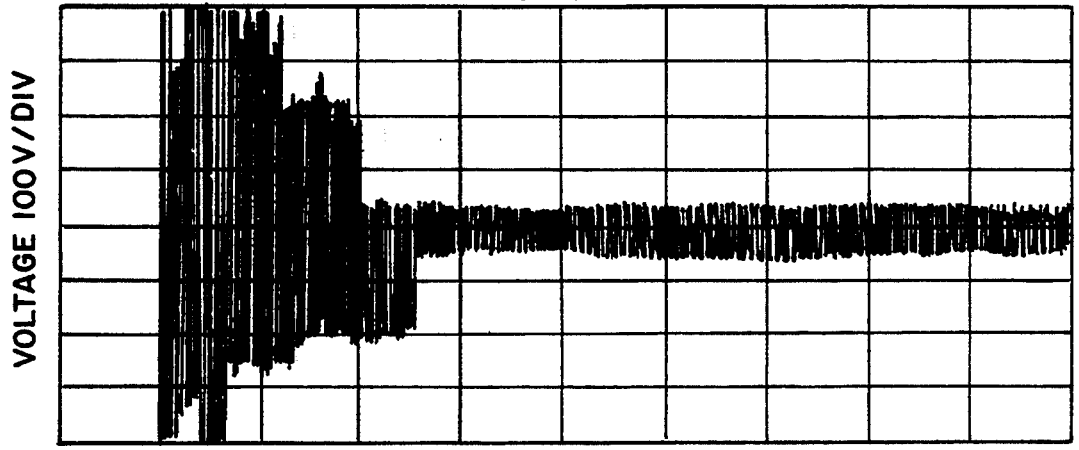
FIG. 16(a-c) shows voltage, current and tungsten emission profiles of a 100 W Metalarc lamp using a ballast having a series capacitor which is shorted prematurely.
Figure 16B:
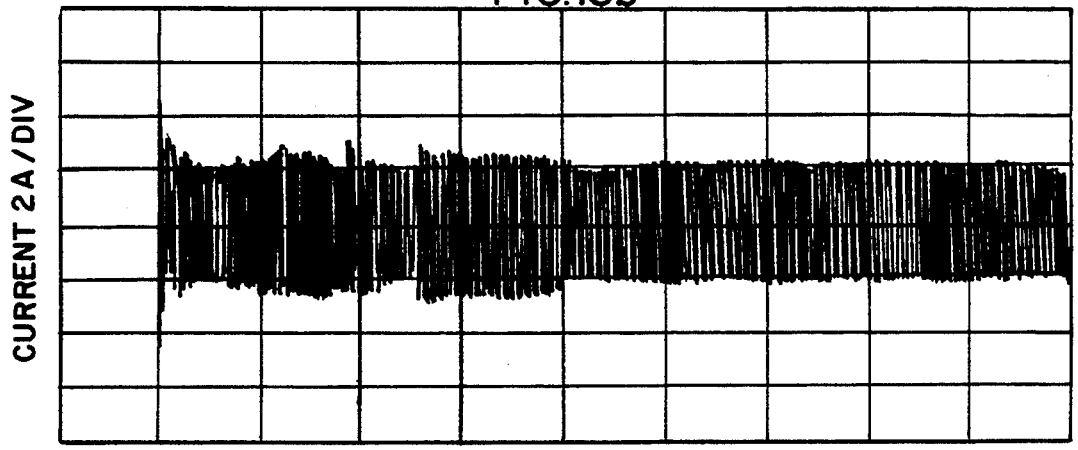
Figure 16C:
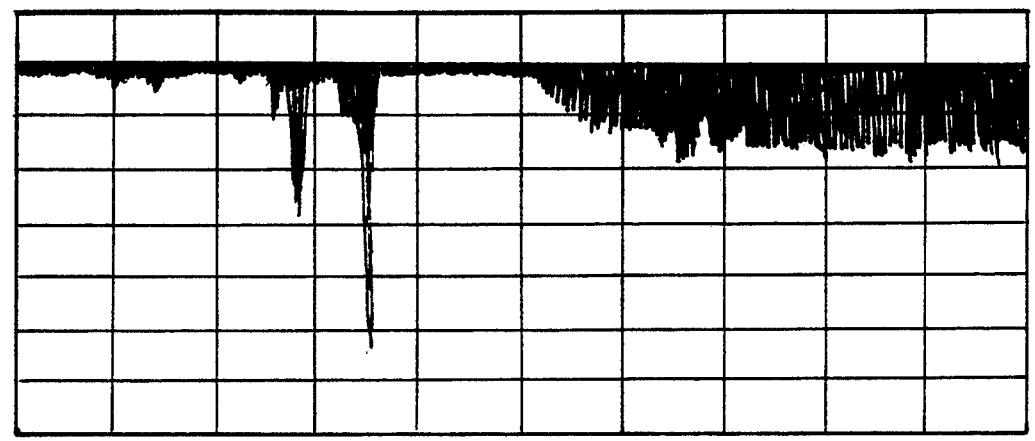

The voltage, current and tungsten emission waveforms for the 100 W Metalarc lamp with a standard ballast are shown in FIG. 14. With the addition of the series capacitor, the current increased and consequently the voltage drop across the lamp decreased to such a level that much less tungsten radiation is observed during this phase (See FIG. 15). This difference is further demonstrated in FIG. 16 which displays the consequences of prematurely shorting the series capacitor. In this case the lamp was started with the capacitor in place and the switch was closed at time $t_2$ to short the capacitor. The decrease in current, increase in voltage drop and very pronounced increase in tungsten emission are initiated at time $t_2$. This clearly demonstrates the role of the capacitor during lamp starting. It improves lamp maintenance through the reduction of the electrode sputtering and consequently the reduction of the wall blackening.

An accelerated life test was performed to investigate the ballast-lamp system with the capacitor and switch circuit. No change was detected in the performance of this circuit up to 500 starts (with the switching time $t_1$ set to 50 seconds) and up to 4 hours of continuous operation with the capacitors being connected in series with the lamp.

An alternative approach to trigger the switch connecting or disconnecting the reactive component is to trigger the triac when the voltage across the lamp rises to some preselected value, rather than after some elapsed time. As the pressure inside the lamp rises just prior to the transition to the final arc phase, the voltage across the lamp rises. The lamp voltage may be sensed and employed with a circuit modification to trigger the triac.

Figure 17:
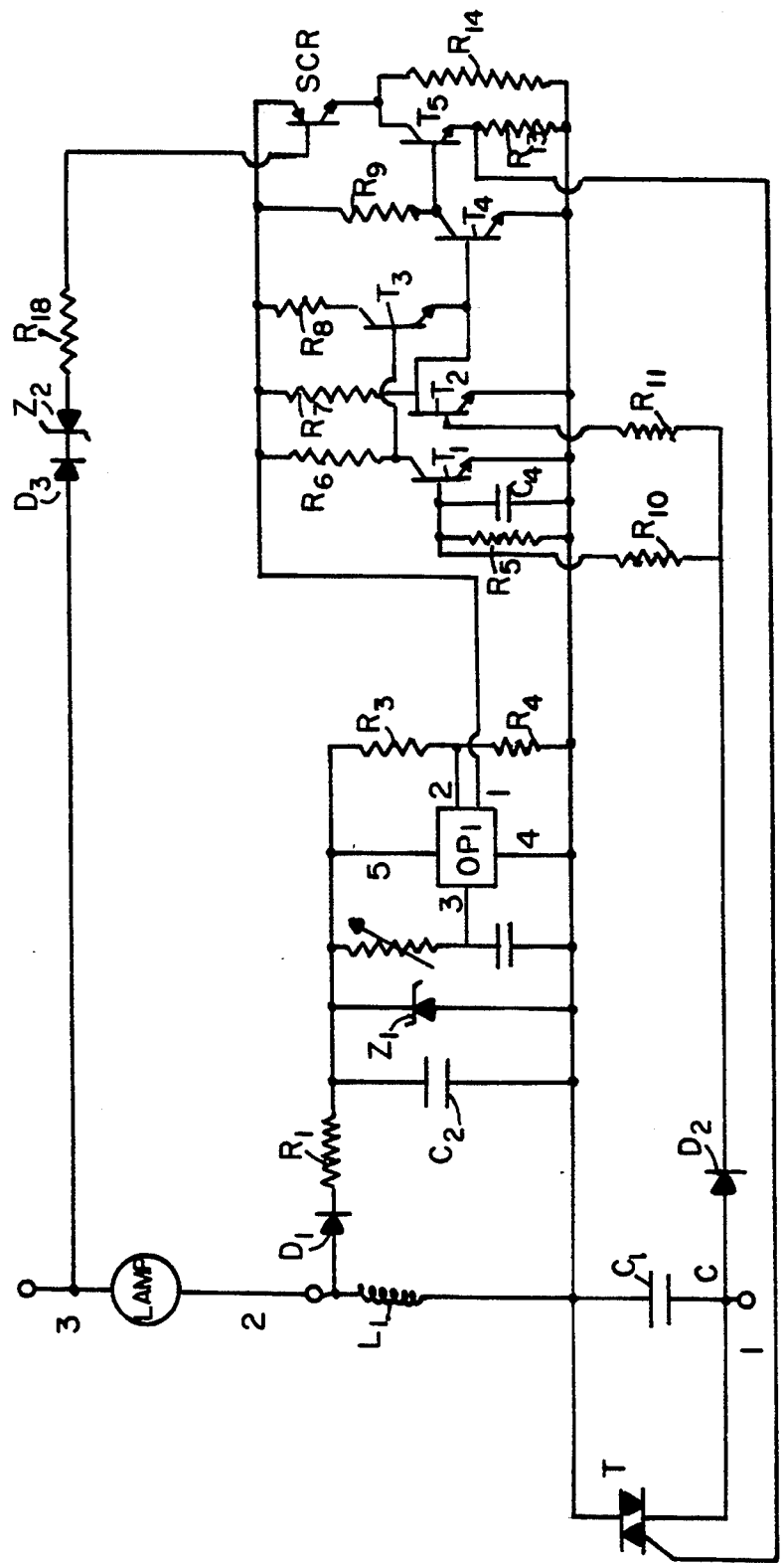
FIG. 17 shows an alternative circuit for carrying out the invention.

During the glow phase of starting a high voltage appears across the lamp. Precautions must be taken to prevent premature triggering during the glow phase. Consequently, it is convenient to use the timing circuit previously described to maintain the triggering circuit inactive during the breakdown, glow and glow-to-arc transition phases. The triggering circuit should be activated when the following three conditions are satisfied: (1) the preset delay time has passed (this delay time has to be sufficient enough so the high voltage transients will not appear); (2) the voltage across the lamp has risen to exceed some pre-selected value; and (3) the AC waveform across the capacitor is at the zero crossing point (to prevent the triac from being damaged). Since the previously described circuit accomplishes two of these conditions (first and third), we require only a small amount of additional circuitry to meet the second condition. FIG. 17 is a modification of the circuit shown in FIG. 13 in which the output stage is changed to require an additional signal generated from the lamp voltage in order to turn on the triac switch.

In FIG. 13, the output from the collector of transistor $T_4$ is applied directly to the gate of the triac. In the voltage triggered circuit shown in FIG. 17, the output of $T_4$ is fed to the base of transistor $T_5$, and the gate of the triac is fed from $R_{13}$ in the emitter circuit of $T_5$. The ratio of $R_{13}$ to $R_9$ is chosen such that the pulses from $T_4$ alone are too small to trigger the triac.

When the voltage across the lamp exceeds the breakdown voltage of zener $Z_2$, $SCR_1$ is turned on, raising the collector of transistor $T_5$ to close to the supply voltage from $OP_1$. This activates $T_5$, such that pulses from $T_4$, which occur at the zero crossing, can now produce a sufficient voltage swing across $R_{13}$ to trigger on the triac $TR_1$. Suitable values of $R_{13}$ and $R_{14}$ are 1.2 kohm and 2.7 kohm, respectively.

Component Values

While not critical the values for the components in FIG. 17 are the same as in FIG. 13 except as follows.

| | |
|---|---|
| $R_{12}$ | 10 kohm |
| $R_{13}$ | 1.2 kohm |
| $R_{14}$ | 2.7 kohm |
| $SCR_1$ | ECG 5400 |
| $Z_2$ | ECG 5043 A |
| $Z_1$ | ECG 5024 A |
| $D_3$ | ECG 125 |
| $T_5$ | ECG 128 |

This circuit triggers on the triac only after the three conditions are met, namely the supply voltage from the operational amplifier has risen because of the elapsed time, the voltage across the lamp has exceeded the zener diode voltage and turned on $SCR_1$, and the zero crossing pulses from $T_4$ have been amplified by the activated $T_5$.

While there have been shown and described what are at present considered to be the preferred embodiments of the invention, it will be apparent to those skilled in the art that various changes and modifications can be made herein without departing from the scope of the invention defined by the appended claims.

What is claimed is:

1. A circuit arrangement for igniting and operating a high intensity discharge lamp normally requiring a predetermined starting voltage which causes a predetermined tungsten emission during the thermionic arc phase of lamp starting, said circuit arrangement comprising:
   a first AC supply source providing a first AC voltage across said lamp during lamp starting, said first AC voltage being greater than the predetermined starting voltage of said lamp;
   a second AC supply source providing a second AC voltage lower than said first AC voltage;
   an inductive ballast having an input;
   switch means for coupling said first or said second AC supply source to said input of said inductive ballast; and control means for controlling operation of said switch means whereby said first AC supply source is coupled to the input of said inductive ballast during lamp starting so as to substantially reduce said predetermined tungsten emission during the thermionic arc phase of lamp starting and whereby said second AC supply source is coupled to the input of said inductive ballast during normal lamp operation.

2. The circuit arrangement of claim 1 wherein said ballast is an autotransformer.

* * * * *